(12) United States Patent
Frodsham et al.

(10) Patent No.: US 7,746,795 B2
(45) Date of Patent: Jun. 29, 2010

(54) METHOD, SYSTEM, AND APPARATUS FOR LOOPBACK PARAMETER EXCHANGE

(75) Inventors: Tim Frodsham, Portland, OR (US); Naveen Cherukuri, San Jose, CA (US); Sanjay Dabral, Palo Alto, CA (US); David S. Dunning, Portland, OR (US); Theodore Z. Schoenborn, Portland, OR (US); Lakshminarayan Krishnamurty, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1075 days.

(21) Appl. No.: 10/897,609

(22) Filed: Jul. 23, 2004

(65) Prior Publication Data

US 2006/0018265 A1 Jan. 26, 2006

(51) Int. Cl.
*G01R 31/08* (2006.01)
(52) U.S. Cl. .................................... 370/249
(58) Field of Classification Search ................ 370/249; 709/223; 714/716–717
See application file for complete search history.

(56) References Cited

U.S. PATENT DOCUMENTS

| | | | |
|---|---|---|---|
| 4,564,933 A | | 1/1986 | Hirst |
| 5,010,544 A | | 4/1991 | Chang et al. |
| 5,343,461 A | | 8/1994 | Barton et al. |
| 6,023,774 A | * | 2/2000 | Minagawa ................ 714/43 |
| 6,144,633 A | * | 11/2000 | Ikeda et al. .............. 370/217 |
| 7,260,066 B2 | * | 8/2007 | Wang et al. .............. 370/248 |
| 7,366,964 B2 | | 4/2008 | Frodsham et al. |
| 2002/0015423 A1 | * | 2/2002 | Rakib et al. ............. 370/485 |
| 2004/0030977 A1 | * | 2/2004 | Jiang et al. .............. 714/742 |
| 2005/0220033 A1 | * | 10/2005 | DelRegno et al. ........ 370/249 |
| 2006/0161817 A1 | * | 7/2006 | Wong et al. ............... 714/43 |
| 2006/0189285 A1 | * | 8/2006 | Takano et al. ........... 455/127.2 |

OTHER PUBLICATIONS

Office Action from U.S. Appl. No. 10/897,596 mailed Oct. 3, 2006, 11 pgs.
Notice of Allowance for U.S. Appl. No. 10/897,596 mailed Feb. 5, 2008, 9 pgs.

* cited by examiner

*Primary Examiner*—Hanh Nguyen
*Assistant Examiner*—Tung Q Tran
(74) *Attorney, Agent, or Firm*—Blakely, Sokoloff, Taylor & Zafman LLP (57) ABSTRACT

A loopback test to test a communication link for a layered interface where in a master agent programs the electrical parameters for the slave agent, such as, the offset, timing, and current compensation with a loopback control register. The slave agent's transmitter and receiver are independently controlled and the master agent may use a slave-echoed data test pattern to detect errors and subsequently sets the appropriate status bits in a loop back status register

19 Claims, 6 Drawing Sheets

Loop Back Control Register Definition

| Bit | Width | Default Value | Description |
|---|---|---|---|
| 0 | 1 | 0 | Start Loop Back test - Flag<br>0: Stop the test<br>1: Start the test |
| 1 | 1 | 0 | Stop on error - Flag<br>0: Do not stop the test on error<br>1: Stop the test on first error |
| 2:9 | 8 | All 0's | Loop Counter |
| 10:29 | 20 | All 0's | Lane Mask |
| 30:34 | 5 | All 0's | Lane of Interest vector |
| 35:42 | 8 | All 0's | Master Agent - Receiver Input CM Override |
| 51:58 | 8 | All 0's | Master Agent - Receiver Strobe Override |
| 43:50 | 8 | All 0's | Slave Agent - Receiver Input CM Override |
| 59:66 | 8 | All 0's | Slave Agent - Receiver Strobe Override |
| 75:82 | 8 | All 1's | Slave Agent - Transmitter Drive current Override |
| 91:98 | 8 | All 0's | Slave Agent - Transmitter Equalizer Settings Override |

Figure 3

Loop Back Status Register Definition

| Bit | Width | Default Value | Description |
|---|---|---|---|
| 0 | 1 | 0 | Failure Flag<br>Failure<br>0: No<br>1: Failure on any Lane |
| 1:20 | 20 | All 0's | Lane Failure |
| 21:60 | 40 | All 0's | Received Pattern vector |
| 61:65 | 5 | All 0's | Failure Index |
| 66:95 | 30 | All 0's | Reserved |

METHOD, SYSTEM, AND APPARATUS FOR LOOPBACK PARAMETER EXCHANGE

RELATED APPLICATIONS

The present U.S. Patent application is related to the following U.S. Patent applications:

(1) application Ser. No. 10/897,596, with the same set of inventors, filed Jul. 23, 2004, 2004, entitled "LOOPBACK ENTRY AND EXIT"

BACKGROUND OF THE INVENTION

1. Field of the Invention

The present invention relates to testing for high-speed point-to-point link networks. More particularly, the invention relates to how loop back testing may be applied for testing an interconnect architecture utilizing point-to-point links. For example, the following application details a loop back parameter exchange that may be used in connection with the other related patent application.

2. Description of the Related Art

As the technology for manufacturing integrated circuits advances, more logic functions are included in a single integrated circuit device or a system on a chip (SoC). Modem integrated circuit (IC) devices include large numbers of gates on a single semiconductor chip, with these gates interconnected so as to perform multiple and complex functions. The fabrication of an IC incorporating such Very Large Scale Integration (VLSI) must be error free, as any manufacturing defect may prevent the IC from performing all of the functions that an IC or SoC is designed to perform. Such demands require verification of the design of the IC or SoC and also various types of electrical testing after the IC or SoC is manufactured.

However, as the complexity of the ICs and SoCs increase, so does the cost and complexity of verifying and electrically testing the individual IC or multiple ICs in a system. Testing, manufacturing costs and design complexity increase dramatically because of the increasing number of functional pins on the integrated devices and SoC. With the increased number of I/O pins on each integrated device or system, the complexity and cost of testing each I/O pin has increased. Furthermore, the complexity of testing has increased with the advent of computer architectures are utilizing multiple agents, such as, a plurality of caching agents and home agents coupled to a network fabric. For example, a scheme with a master and slave agent may require either of the following that increase testing complexity or utilize additional hardware resources: an external control for chip set agents, lack of standardization of testing high speed I/O interfaces, and testing registers for both master and slave agents.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

DETAILED DESCRIPTION OF THE INVENTION

A method, apparatus, and system for loopback testing for a high speed point to point network (pTp) is described In the following description, for purposes of explanation, numerous details are set forth in order to provide a thorough understanding of the present invention. However, it will be apparent to one skilled in the art that these specific details are not required in order to practice the present invention.

An area of current technological development relates to reducing test complexity and cost. As previously described, DFT methods facilitate the testing of ICs and SoCs. In contrast, the claimed subject matter facilitates a master slave methodology for a loopback testing scheme for a pTp network that allows control of the loop back overrides on both agents from one master agent. For example, a master agent is used to control aspects of the loop back testing. In one embodiment, the master agent is a microprocessor. In another aspect, the claimed subject matter teaches a standard set of registers and bits for loop back testing that allows higher layers of test software to manipulate the registers and bits to enable and obtain complicated test programs and interface information.

As previously described, the claimed subject matter teaches a standardized set of register and bit definitions ("hooks") for a physical layer. Consequently, standardized test applications may utilize the physical layer hooks and register definitions to enable higher level BIST (IBIST, IOBIST, MARS, etc. Furthermore, the claimed subject matter enables cross platform and cross product use of standardized test applications for a pTp network with multiple layers. In one embodiment, one pTp network is Intel's Common System Interface (CSI). In yet another aspect, the claimed subject matter allows the physical layer to control the parameter exchange, hence, there is no need to reset any of the other layers to perform a loopback test. The claimed subject matter utilizes a handshaking protocol without any special control signals.

As previously described, different circuitry (circuit hooks) are depicted in this patent application and are included in the Transmitter and Receiver circuits of the CSI interface. For example, the use of an offset controlled front end amplifier is used in the receiver front end for supporting voltage margining. In this case, multiple register bits control multiple current sources for adding or subtracting a predetermined offset to the receiver front end amplifier. Another hardware hook to support timing margining is the use of phase interpolator to sample the incoming data—in this case, the interpolator allows the sampling edge to be shifted in increments by programmable delays controlled by register bits. A third example of a hardware hooks is on the transmitter side where the amount transmitter driver current is programmable through the use of multiple current sources, again controlled through register bits. The preceding offset, driver current, and sampling controls are discussed in further detail in connection with FIGS. 3-4.

The claimed subject matter facilitates loop back testing for an pTp architecture with a plurality of caching agents and home agents coupled to a network fabric. For example, the network fabric may comprise either or all of: a link layer, a protocol layer, a routing layer, a transport layer, and a physical layer. The fabric facilitates transporting messages from one protocol (home or caching agent) to another protocol for a point to point network In one embodiment, one pTp network is Intel's Common System Interface (CSI). In this embodiment, transmitters and receivers of a CSI port, or two different CSI ports are attached to each other. Subsequently, test patterns are generated and checked while the interface electrical and timing parameters are stressed. Therefore, the claimed subject matter describes a method for setting up the two agents involved in the loop back function by which one agent can control the various overrides in the transmitter and receiver of both agents involved. The agent controlling the override parameters is the master agent. The slave agent receives all loop back control and override from the master in band, and needs no external control.

In one embodiment, the loopback patterns are stored in a 40 bit deep single pattern generator register for all of the lanes of a communication link. In one embodiment, there are 20 lanes for the link.

Figure 1:
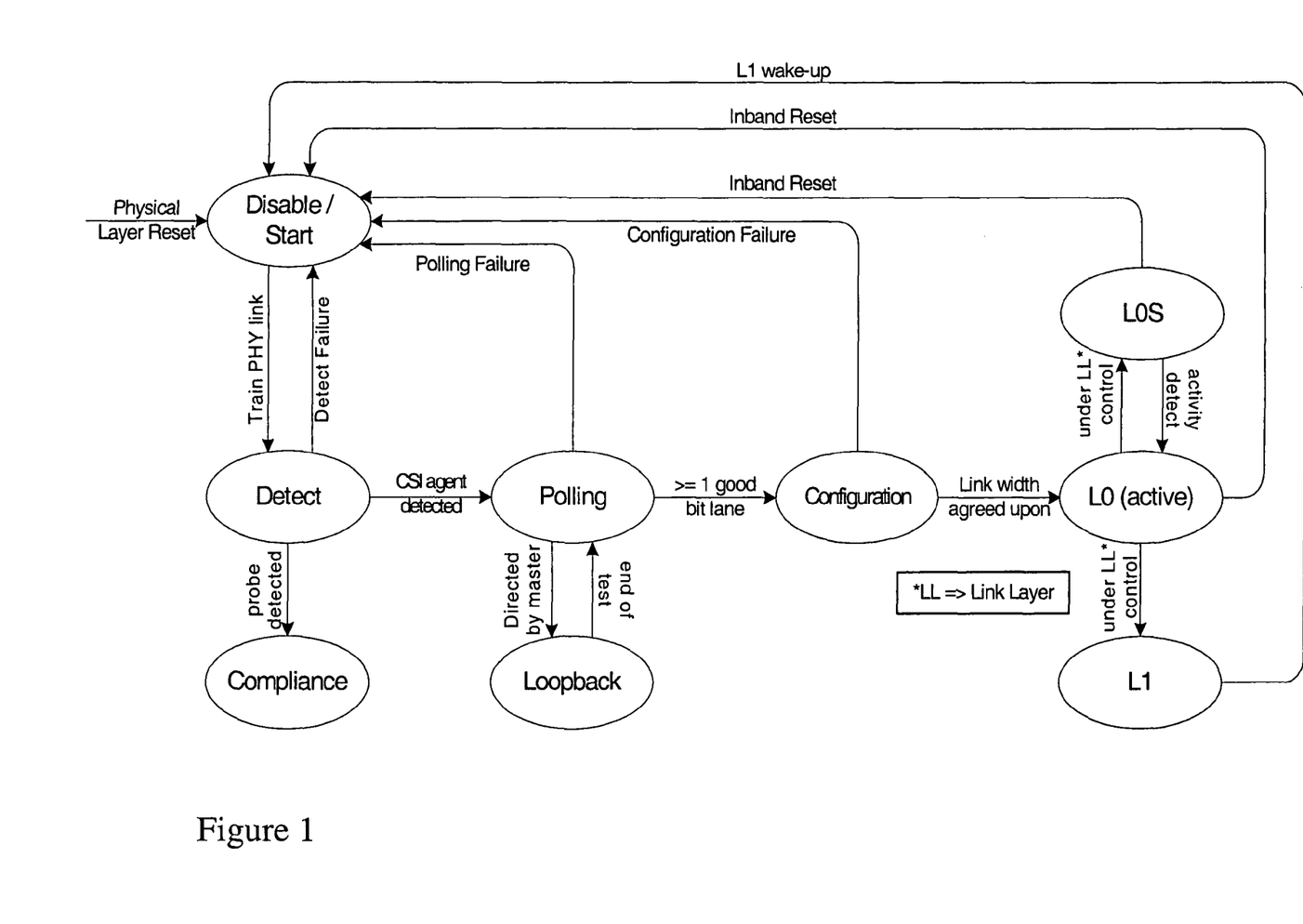
FIG. 1 illustrates a link state diagram as utilized by an embodiment.

FIG. 1 illustrates a link state diagram as utilized by an embodiment. In one embodiment, the loop back function is integrated into a physical layer as a separate state in the depicted link state diagram. As previously described, the claimed subject matter facilitates loop back testing for an pTp architecture with a plurality of caching agents and home agents coupled to a network fabric. The network fabric may comprise either or all of: a link layer, a protocol layer, a routing layer, a transport layer, and a physical layer. In this figure, the loop back function is integrated into the physical layer. To further clarify, a link layer allows for data transfer and flow control between two directly connected CSI agents and virtualization of the physical channel. In contrast, the physical layer facilitates electrical transfer of information between two directly connected CSI agents.

For example, a normal operation for this pTp architecture allows the link to transition from a detect to L0 transition after a power good signal has been asserted from a higher layer. The higher layer may be any of the other layers, such as, the link layer, the protocol layer, the routing layer, or the transport layer.

In this embodiment, the L0 state is the normal operational state of a link. Furthermore, the loop back functional state, designated as an oval labeled "Loopback", is controlled by a link layer setting or clearing a loop back control bit in the TS-x training patterns. The entry and exit of the loopback functional testing is discussed in further detail in the related application, titled "LOOPBACK ENTRY AND EXIT", submitted by the same inventors on the same filing date.

Figure 2:
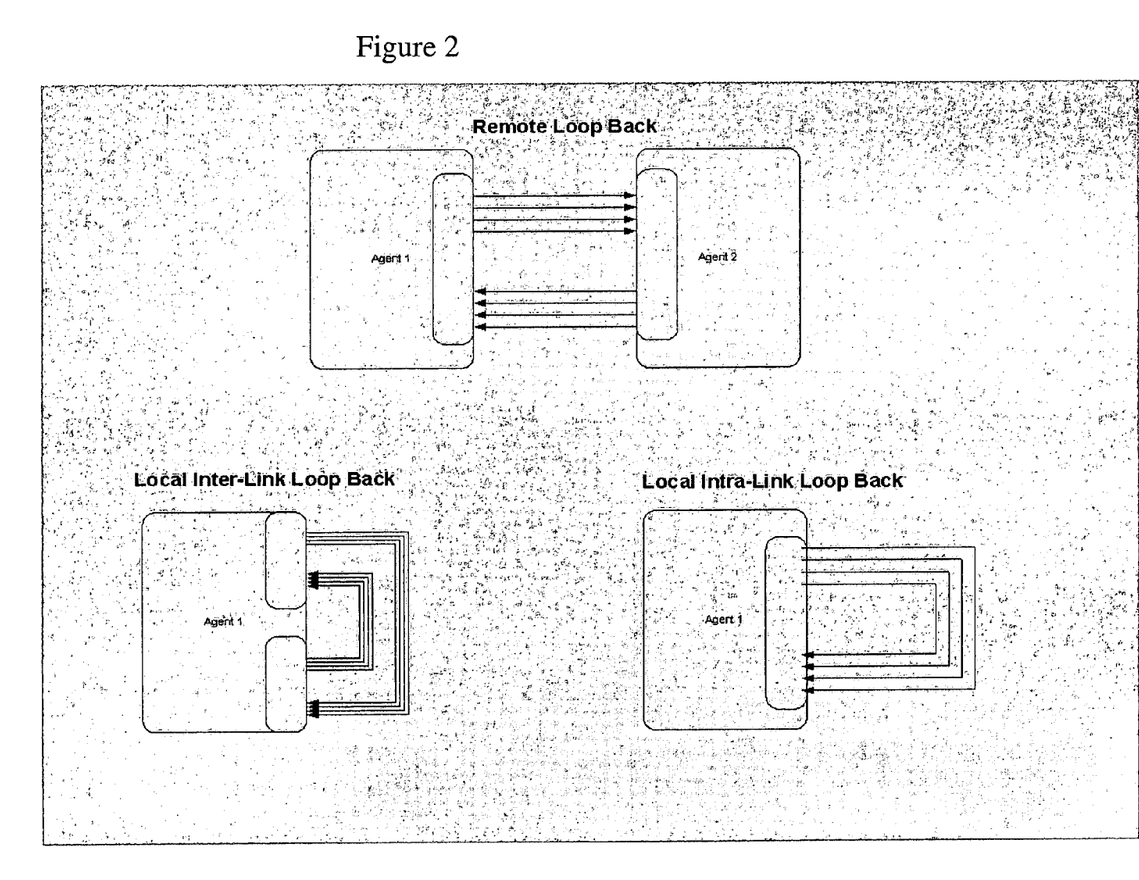
FIG. 2 illustrates multiple loop back types as supported by an embodiment.

FIG. 2 illustrates multiple loop back types as supported by an embodiment. In one embodiment, the claimed subject matter facilitates a master-slave Loop back methodology. For example, this methodology allows the link layer to configure either of the Near-end and Far-end agents as either a Master or a Slave at power up. In this embodiment, the loop back tests are performed with the master configured agent supporting pattern generation, results comparison, and error detection. In this embodiment, three different types of loop back tests are depicted, a remote loop back, a local loop back inter-link, and a local loop back intra-link.

In one embodiment, remote loop back is a loop back path between different links on different devices. In this configuration, one device functions as a loop back master, and the other as a loop back slave. In another embodiment, the local loop back is defined as loop back between the transmitters and receivers of the same agent. For example, the local loop back could be further be sub-divided as Inter-Link and Intra-Link for the agent. In an inter-link loop back for the agent—the loop back happens between the transmitters and receivers of 2 separate links in the agent. Therefore, one may designate one link as the Master and the second link as the slave. In contrast, the intra-link local loop does not have a slave agent, rather, the device is programmed as the master and the device's receivers and transmitters are looped back to each other. Furthermore, the overrides on this device occur through any external access mechanism, such as, a test access port (TAP).

Figure 3:
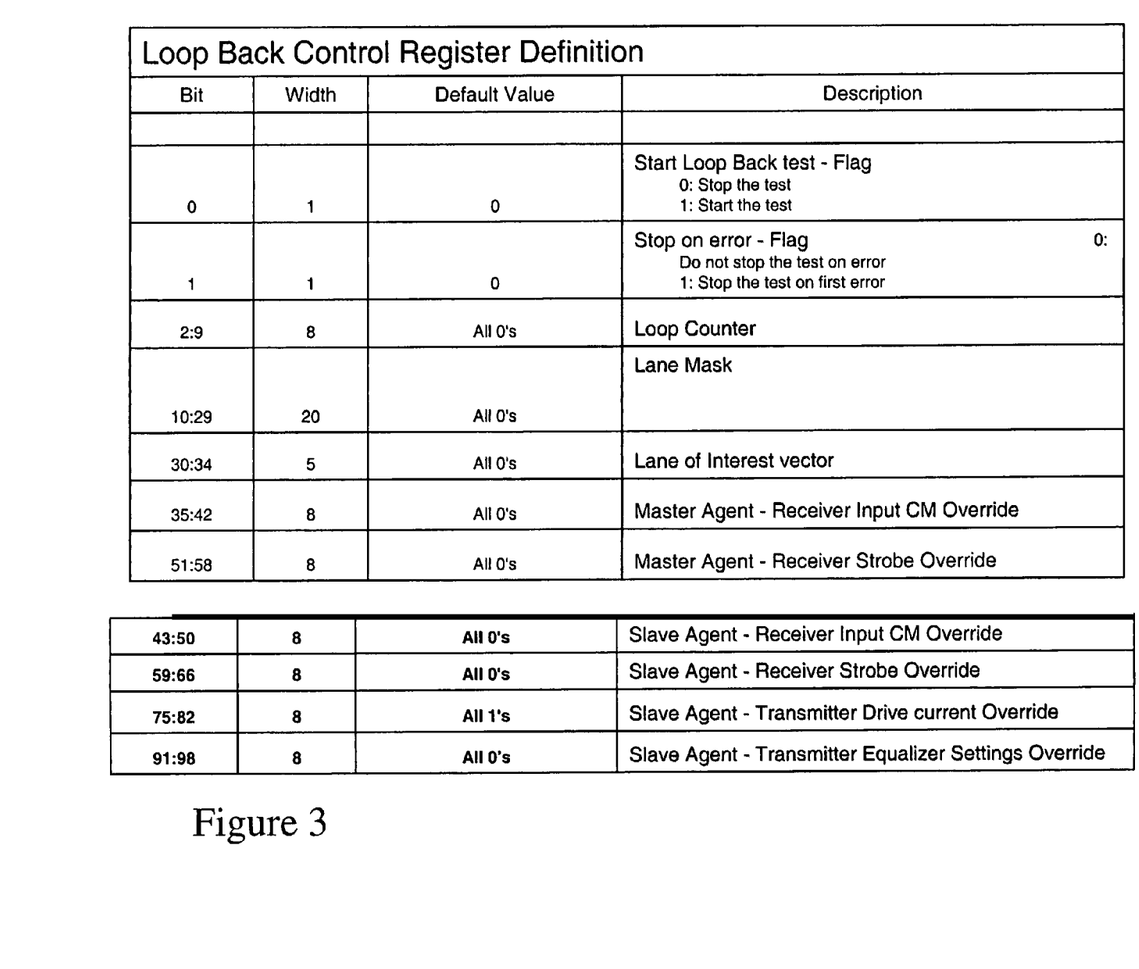
FIG. 3 illustrates a loop back control register as utilized by an embodiment.

FIG. 3 illustrates a loop back control register as utilized by an embodiment. In one embodiment, the claimed subject matter facilitates loopback testing for a pTp architecture with at least a link layer and physical layer. In this embodiment, the link layer specifies the overrides and controls to the physical layer via a loop back control register, this register and the individual bits are depicted in this figure. In one embodiment, the loopback control register is located in the physical layer.

In one embodiment, bit 0 of the loop back control register is a flag for indicating a start of the loop back test. In this embodiment, a value of one for this bit indicates the start of the test while a value of zero indicates stopping the test.

In one embodiment, bit 1 of the loop back control register is a flag for indicating a stop on error flag of the loop back test. In this embodiment, a value of one for this bit indicates the loopback test to stop upon detecting a first error while a value of zero indicates not stopping on the first error.

In one embodiment, bits 2-9 are for a loop counter. In one embodiment, the loop counter is an 8-bit field for counting the number of loops for the previously described 40 bit pattern generator. In this embodiment, a value of all 0's for the loop counter indicates to disable the count, consequently, the test allow for constantly looping the test patterns. In this embodiment, a value of "00000001" for the loop counter indicates to loop the contents of 40 bit pattern register once and stop. In this embodiment, a value of "11111111" for the loop counter indicates to loop the contents of 40 bit pattern register 256 times and stop In one embodiment, bits 10:29 are for a lane mask. In one embodiment, the lane mask is a 20 bit vector for masking any lane. For example, it may be used with the lane of interest vector (described in the next paragraph.

In one embodiment, bits 30:34 are for a lane of interest vector. In one embodiment, the lane of interest vector is 5-bit field is used to specify which lane (out of the 20 lanes) needs to be observed for errors. In this embodiment, the lane of interest vector is a binary coded vector.

In this embodiment, a value of all 1's for the lane of interest vector indicates that the claimed subject matter observes ALL lanes. In this embodiment, a value of "00001" for the lane of interest vector indicates that the claimed subject matter observes lane 1, a value of "00010" for the lane of interest vector indicates that the claimed subject matter observes lane 2, a value of "10100" for the lane of interest vector indicates that the claimed subject matter observes lane 20.

In one embodiment, bits 35:42 are for receiver input variable offset comparator (VOC) settings for the master agent. The following table depicts the possible settings. In one embodiment, the bits are decoded into two sets of VOC control for a 2 way interleaved design.

| Bit | Default Value | Description |
|---|---|---|
| 7:0 | 00000000<br>(Normal Settings - no offset added) | RX – VOC Settings Control – 8 bits = 256 settings<br>This makes use of 2's complement. These bits need to be decoded into 2 sets of VOC control for 2-way inter leaved design.<br><br>01111111 ⟶ Maximum Positive Offset to nominal settings<br>⋮<br>00000000 ⟶ No Offset<br>⋮<br>10000000 ⟶ Maximum Negative Offset to nominal settings<br><br>RX PI Strobe Control Register = 01111111<br>VCM = Nominal + Max Positve Offset<br>VCM = Nominal<br><br>RX PI Strobe Control Register = 10000000<br>VCM = Nominal<br>VCM = Nominal - Max Negative Offset |

In one embodiment, bits 51:58 are for receiver strove override settings for the master agent. The following table depicts the possible settings. In one embodiment, the eight bits are for 256 settings by utilizing 2's complement arithmetic for the adder. The Phase Interpolator (PI) is a circuit that centers a strobe in a middle of a received data by interpolating between the phases for an incoming forwarded clock.

In one embodiment, bits 43:50 are for receiver input variable offset comparator (VOC) settings for the slave agent. The following table depicts the possible settings. In one embodiment, the bits are decoded into two sets of VOC control for a 2 way interleaved design.

| Bit | Default Value | Description |
|---|---|---|
| 7:0 | 00000000<br>(Normal Settings - no offset added) | RX – VOC Settings Control – 8 bits = 256 settings<br>This makes use of 2's complement. These bits need to be decoded into 2 sets of VOC control for 2-way inter leaved design.<br><br>01111111 ⟶ Maximum Positive Offset to nominal settings<br>⋮<br>00000000 ⟶ No Offset<br>⋮<br>10000000 ⟶ Maximum Negative Offset to nominal settings<br><br>RX PI Strobe Control Register = 01111111<br>VCM = Nominal + Max Positve Offset<br>VCM = Nominal<br><br>RX PI Strobe Control Register = 10000000<br>VCM = Nominal<br>VCM = Nominal - Max Negative Offset |

In one embodiment, bits 59:66 are for receiver strove override settings for the slave agent. The following table depicts the possible settings. In one embodiment, the eight bits are for 256 settings by utilizing 2's complement arithmetic for the adder.

In one embodiment, bits 75:82 are for transmitter output current compensation settings for the slave agent. The following table illustrates the settings and the respective output swings for the transmitter.

-continued

| Bit | Default Value | Description |
| --- | --- | --- |

The previously described settings for the slave agent can by utilized by the master agent to program the electrical parameters for the slave agent, such as, the offset, timing, etc. Therefore, the slave agent's transmitter and receiver are independently controlled. Likewise, the master agent may use the slave-echoed data test pattern to detect errors and subsequently sets the appropriate status bits in the loop back status register (discussed further in connection with FIG. 4).

Figure 4:
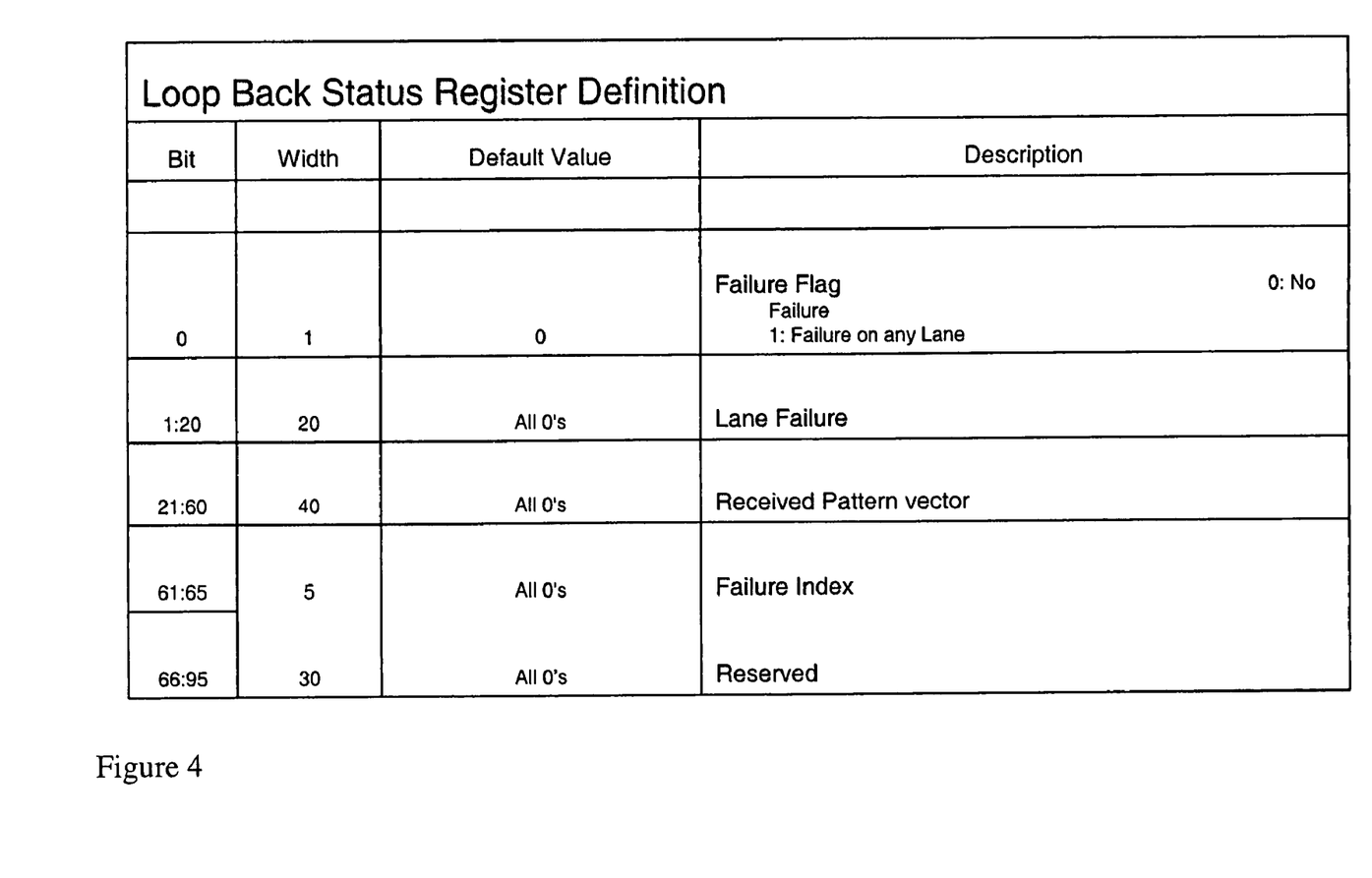
FIG. 4 illustrates a loop back status register as utilized by an embodiment.

FIG. 4 illustrates a loop back status register as utilized by an embodiment. In one embodiment, the physical layer utilizes the loop back status register for updating the results of an loop back test. In one embodiment, the loopback status register is located in the physical layer.

In one embodiment, bit 0 is for a failure flag to indicate whether a error has been encountered in any lane. For example, in one embodiment, a value of zero indicates no failure, in contrast, a value of one indicates a failure in any lane.

In one embodiment, bits 1:20 are for a lane failure to indicate either a number of errors seen in the lane or the lane number that encountered the failure. Thus, in one embodiment, it is a dual purpose register. For example, in one embodiment, the lane failure indicates the lane number that encountered the failure when the stop on error flag is set (the stop on error flag was previously described in connection with bit 1 of the loop back control register in FIG. 3). In contrast, the lane failure indicates the number of errors seen in the lane when the stop on error flag is not set.

However, the claimed subject matter is not limited to 20 bits for the lane failure indicator. One skilled in the art appreciates utilizing different numbers of bits for smaller or larger lanes.

In one embodiment, bits 21:60 are for a received pattern vector to indicate either error information captured per lane for the entire link or error information for a particular lane. Thus, in one embodiment, it is a dual purpose register. For example, in one embodiment, the received pattern vector indicates two bits of error information captured per lane for the entire link when the stop on error flag is set and the lane of interest vector indicates an observation of all lanes (previously described in connection with FIG. 3 bit setting of "11111" for bits 30:34). In contrast, forty bits of error information for a particular lane is captured for a lane of interest vector indicates observation of a single lane.

In one embodiment, bits 61:65 are for a failure index for indicating the location of the error in the particular loop back pattern.

Figure 5:
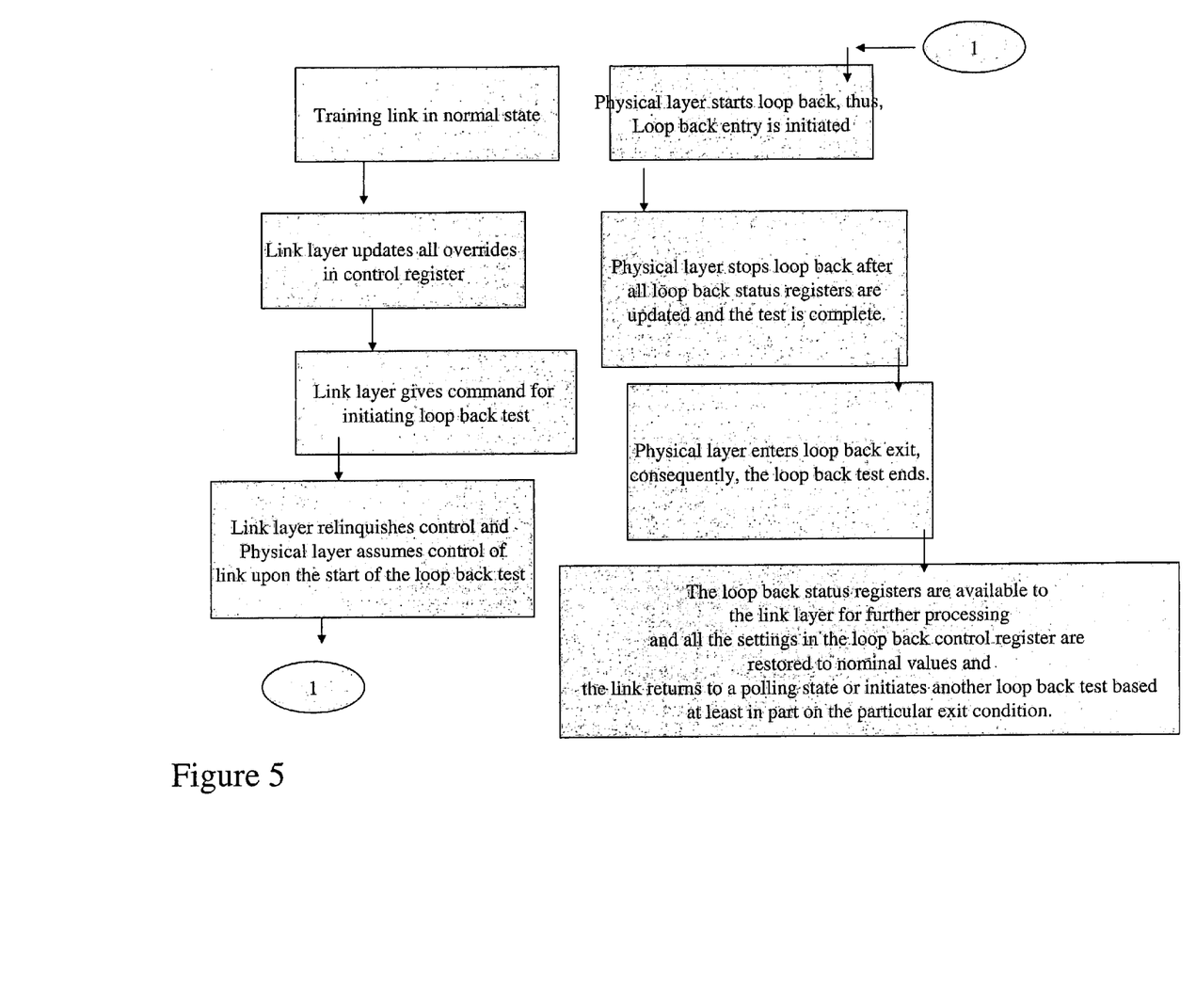
FIG. 5 illustrates a flowchart for a method for a loop back testing utilized in an embodiment.

FIG. 5 illustrates a flowchart for a method for a loop back testing utilized in an embodiment. This flowchart discusses various loop back entry and exit conditions which are discussed in further detail in the related application, entitled "LOOPBACK ENTRY AND EXIT". The flowchart starts with training the communication link in normal state. As previously described, the particular states were discussed in connection with FIG. 1. Subsequently, the link layer updates all overrides in the loop back control register and the link layer gives command for initiating loop back test. The link layer relinquishes control and the physical layer assumes control of the link upon the start of the loop back test with the Loop back entry being initiated. Eventually, the loop back test is complete and the physical layer stops loop back after all loop back status registers are updated. Subsequently, the loop back status registers are available to the link layer for further processing. Likewise, the settings in the loop back control register are restored to nominal values and the link returns to a polling state or initiates another loop back test based at least in part on the particular exit condition.

Figure 6:
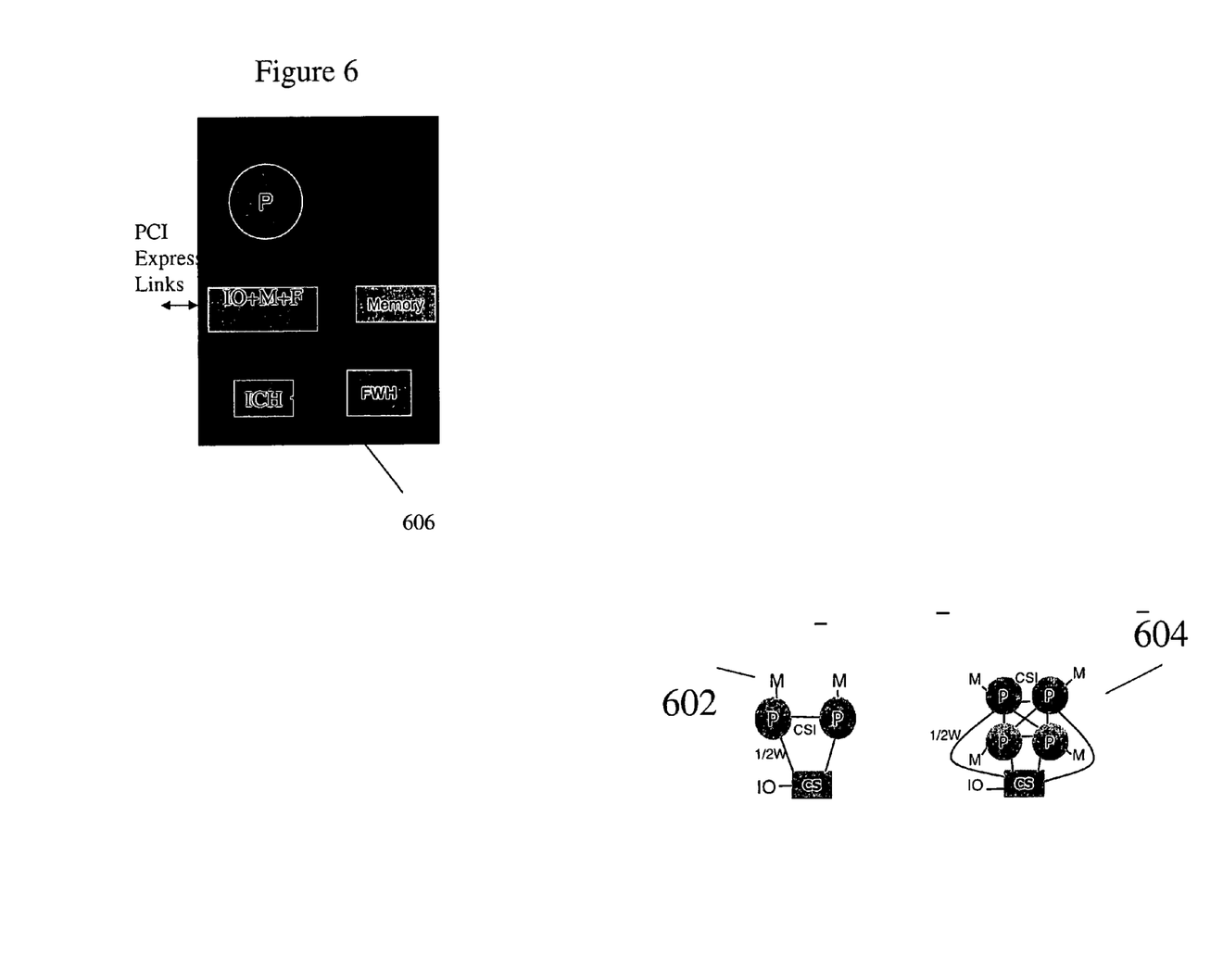
FIG. 6 illustrates multiple embodiments of systems as utilized by one embodiment.

FIG. 6 depicts a point to point system with one or more processors. The claimed subject matter comprises several embodiments, one with one processor 606, one with two processors (P) 602 and one with four processors (P) 604. In embodiments 602 and 604, each processor is coupled to a memory (M) and is connected to each processor via a network fabric may comprise either or all of: a link layer, a protocol layer, a routing layer, a transport layer, and a physical layer. The fabric facilitates transporting messages from one protocol (home or caching agent) to another protocol for a point to point network. As previously described, the system of a network fabric supports any of the embodiments depicted in connection with the preceding Figures and Tables.

For embodiment 606, the uni-processor P is coupled to graphics and memory control, depicted as IO+M+F, via a network fabric link that corresponds to a layered interface. The graphics and memory control is coupled to memory and is capable of receiving and transmitting via PCI Express Links. Likewise, the graphics and memory control is coupled to the ICH. Furthermore, the ICH is coupled to a firmware hub (FWH) via a LPC bus. Also, for a different uni-processor embodiment, the processor would have external network fabric links. The processor may have multiple cores with split or shared caches with each core coupled to a Xbar router and a non-routing global links interface. Thus, the external network fabric links are coupled to the Xbar router and a non-routing global links interface.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. An apparatus for a loopback test configured for a master device and a slave device connected via a layered point-to-point interface with a layered interface comprising:
    a state machine within the master device having a dedicated state for the loopback test in a link layer state diagram;
    a loopback control register to allow the master device to set the electrical parameters for the loopback test to be transmitted to the slave device, wherein the slave device is configured to transmit data back to the master device as part of the loopback test wherein the master-slave loopback scheme is controlled by a physical layer of the master device that controls the exchange of the electrical parameters between the master device and the slave device over the layered point-to-point interface having one or more physical layer hooks and registers to enable higher-level self-testing, and wherein the electrical parameters comprise at least an offset value for an offset controlled transmit amplifier; and
    a loopback status register to store a result of the loopback test.

2. The apparatus of claim 1 wherein the dedicated state for the loopback test is enabled from a polling state by a link layer.

3. The apparatus of claim 1 wherein the loopback control register sets the electrical parameters for both the master device and slave device.

4. The apparatus of claim 1 wherein the electrical parameters are the following: an offset for a variable offset comparator, an offset for a strobe, and output current compensation.

5. The apparatus of claim 1 wherein the result of the loopback test stored in the loopback status register comprises
    a failure flag to indicate whether an error occurred on any lane;
    a lane failure to indicate either a number of errors seen in the lane or the lane number that encountered the failure;
    a received pattern vector to indicate either error information captured per lane for the entire link or error information for a particular lane; and
    a failure index for indicating the location of the error in the particular loop back pattern.

6. An apparatus for a loopback control register for a master-slave loopback scheme comprising:
    the loopback control register to set the electrical parameters for both a master device and a slave agent device, wherein the master device and the slave device are interconnected via a point-to-point interface with a layered interface having one or more physical layer hooks and registers to enable higher-level self-testing; and
    a transmission component within the slave device to transmit data back to the master device over the point-to-point interface according to the electrical parameters, wherein the electrical parameters comprise an offset for a variable offset comparator, an offset for a strobe, and output current compensation.

7. An apparatus for a loopback status register for a master-slave loopback scheme comprising:
    a point-to-point interface having at least an offset controlled amplifier controlled by a physical layer of the master-slave loopback scheme wherein the master-slave loopback scheme is controlled by a physical layer that controls the exchange of the electrical parameters between the master device and the slave device over the layered point-to-point interface and one or more physical layer hooks and registers to enable higher-level self-testing;
    the loopback status register to store a result of the loopback test;
    the loopback status register with:
    a failure flag to indicate whether an error occurred on any lane;
    a lane failure to indicate either a number of errors seen in the lane or the lane number that encountered the failure;
    a received pattern vector to indicate either error information captured per lane for the entire link or error information for a particular lane; and
    a failure index for indicating the location of the error in the particular loop back pattern.

8. The apparatus of claim 7 wherein the master-slave loopback scheme is for a layered interface with a link layer that accesses the loopback status register.

9. An apparatus for a loopback test configured for a point-to-point link between a master device and a slave device with a layered interface comprising:
    a state machine provided by the master device having a dedicated state for the loopback test in a link layer state diagram wherein the loopback test is controlled by a physical layer of the master device that controls the exchange of the electrical parameters between the master device and the slave device over the layered point-to-point interface having one or more physical layer hooks and registers to enable higher-level self-testing, and wherein the electrical parameters comprise at least an offset value for an offset controlled transmit amplifier;
    a loopback control register to allow the master device to set the electrical parameters for the loopback test to the slave device over the point-to-point link;
    a loopback status register to store a result of the loopback test based on data received by the master device from the slave device over the point-to-point link; and
    the apparatus to support a remote loopback test and a local loopback test.

10. The apparatus of claim 9 wherein the dedicated state for the loopback test is enabled from a polling state by a link layer.

11. The apparatus of claim 9 wherein the loopback control register sets the electrical parameters for both the master device and slave device.

12. The apparatus of claim 9 wherein the electrical parameters are the following: an offset for a variable offset comparator, an offset for a strobe, and output current compensation.

13. The apparatus of claim 9 wherein the result of the loopback test stored in the loopback status register comprises
a failure flag to indicate whether an error occurred on any lane;
a lane failure to indicate either a number of errors seen in the lane or the lane number that encountered the failure;
a received pattern vector to indicate either error information captured per lane for the entire link or error information for a particular lane; and
a failure index for indicating the location of the error in the particular loop back pattern.

14. The apparatus of claim 9 wherein the local loopback test is either a local inter-link test or a local intra-link test.

15. A method for loopback testing a communication link for a layered interface with a master device to control a slave device, the layered interface with at least a link layer and a physical layer comprising:
a point-to-point interface having one or more physical layer hooks and registers to enable higher-level self-testing;
updating all overrides in a loopback control register;
relinquishing control and the physical layer assumes control of the communication link upon the start of the loop back test;
initiating the loopback test comprising at least controlling an offset controlled transmit amplifier with a physical layer of the master device; and
updating a loopback status register upon completion of the loopback test.

16. The method of claim 15 wherein a link layer is updating the overrides in the loopback control register.

17. A system to support a loopback test for a communication link for a layered interface that allows a master device to control a slave device with a loopback control register comprising:
the layered interface with at least a link layer and a physical layer configured as a point-to-point link having one or more physical layer hooks and registers to enable higher-level self-testing;
the loopback control register to allow the master device to set the electrical parameters for the loopback test during which data is transmitted between the master device and the slave device wherein the loopback test is controlled by a physical layer that controls the exchange of the electrical parameters between the master device and the slave device over the layered point-to-point interface, and wherein the electrical parameters comprise at least an offset value for an offset controlled transmit amplifier; and
a loopback status register to store a result of the loopback test.

18. The system of claim 17 wherein the loopback control register defines the electrical parameters, the electrical parameters are: an offset for a variable offset comparator, an offset for a strobe, and output current compensation.

19. The system of claim 17 wherein the loopback status register comprises:
a failure flag to indicate whether an error occurred on any lane;
a lane failure to indicate either a number of errors seen in the lane or the lane number that encountered the failure;
a received pattern vector to indicate either error information captured per lane for the entire link or error information for a particular lane; and
a failure index for indicating the location of the error in the particular loop back pattern.

* * * * *